United States Patent [19]
Naohara et al.

[11] Patent Number: 6,151,280
[45] Date of Patent: Nov. 21, 2000

[54] FOCUS JUMP CONTROL APPARATUS OF A PLAYER FOR MULTILAYER RECORDING DISC

[75] Inventors: Shinichi Naohara; Takashi Suzuki; Alex Bradshaw; Motoi Kimura; Norio Matsuda; Kazushige Kawana; Kenichi Takahashi, all of Kawagoe, Japan

[73] Assignee: Pioneer Electronic Corporation, Tokyo, Japan

[21] Appl. No.: 09/105,269

[22] Filed: Jun. 26, 1998

[30] Foreign Application Priority Data

Jun. 27, 1997 [JP] Japan .................................. 9-172663
Nov. 6, 1997 [JP] Japan .................................. 9-304744

[51] Int. Cl.$^7$ ...................................................... G11B 7/00
[52] U.S. Cl. ......................................................... 369/44.27
[58] Field of Search ............................ 369/44.25, 44.27, 369/44.29

[56] References Cited

U.S. PATENT DOCUMENTS

| | | | |
|---|---|---|---|
| 5,740,136 | 4/1998 | Tsutsui et al. ................. | 369/44.27 X |
| 5,754,507 | 5/1998 | Nishikata ....................... | 369/44.29 OR |
| 5,835,460 | 11/1998 | Nishikata ....................... | 369/44.27 OR |
| 5,903,530 | 5/1999 | Tateishi et al. ................ | 369/44.27 OR |
| 5,966,355 | 10/1999 | Kamiyama ...................... | 369/44.27 |

*Primary Examiner*—Aristotelis M. Psitos
*Attorney, Agent, or Firm*—Morgan, Lewis & Bockius LLP

[57] ABSTRACT

A focus jump control apparatus of a player for playing a multilayer recording disc surely achieves a focus jump. This apparatus includes: a focusing servo loop for allowing a focal point to trace a recording surface in accordance with a focusing error signal by using a focusing actuator to displace the focal point of read light to a disc in the optical axial direction; and a tracking servo loop for allowing the focal point to trace disc tracks. A loop opening/closing control unit opens/closes focusing/tracking servo loops in response to an instruction and closes the focusing servo loop when the movement of the focal point from one of the recording surfaces to the other. During the movement of the read light focal point, the closing state of the tracking servo loop is maintained. Jump driving means generates a drive signal of the actuator to move the focal point from one of the recording surfaces to the other based on the error signal under the opening/closing control of the focusing/tracking servo loops.

16 Claims, 13 Drawing Sheets

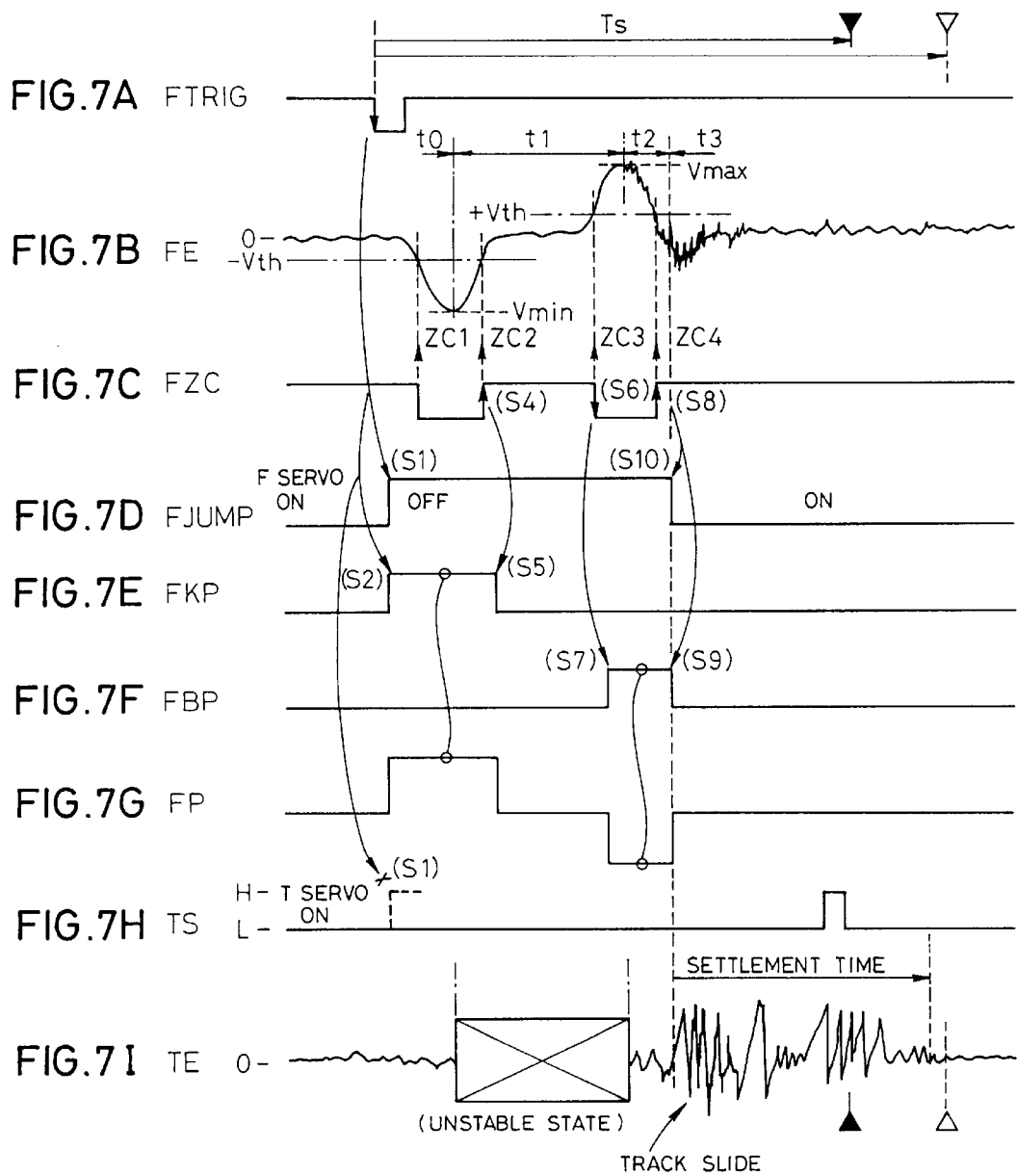

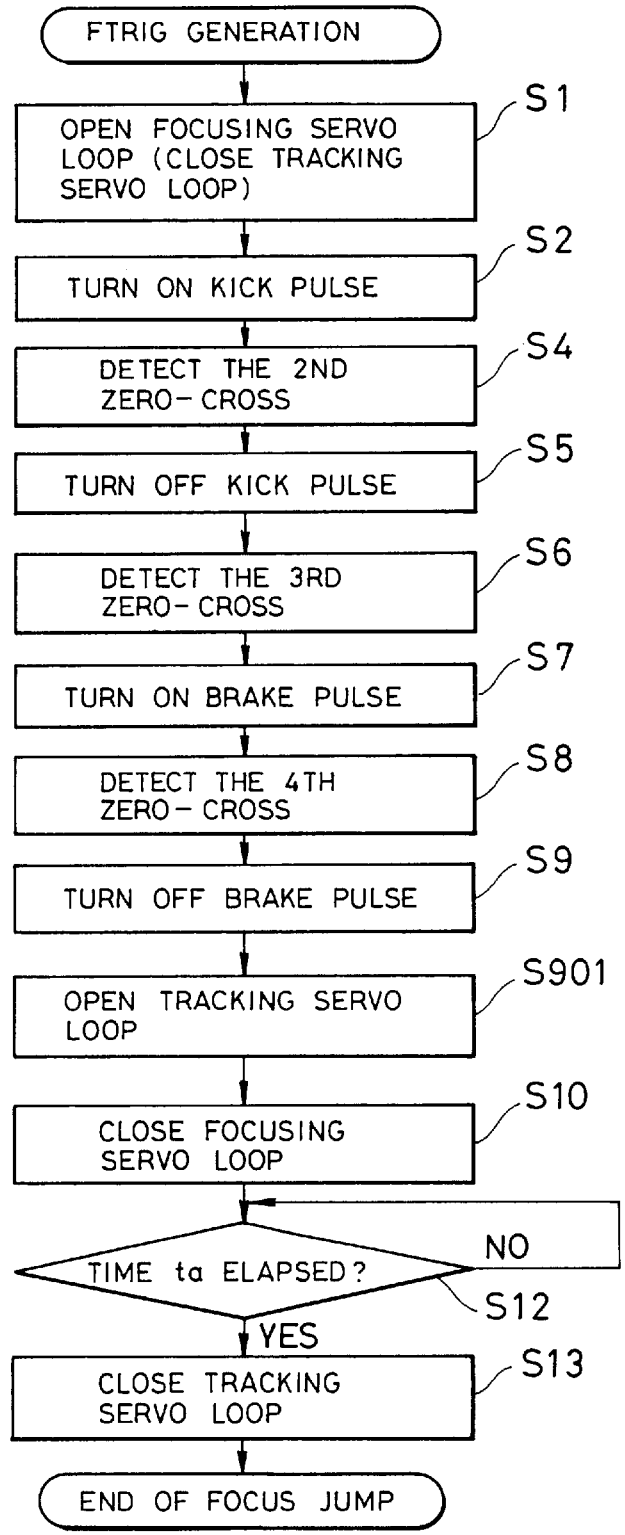

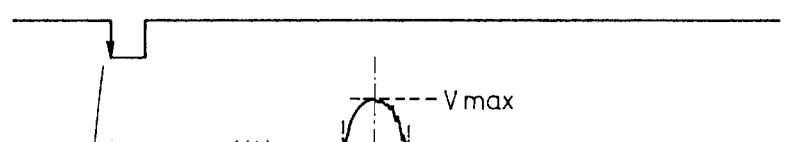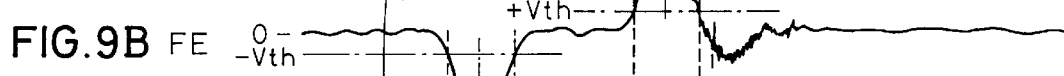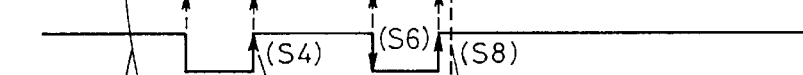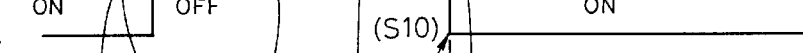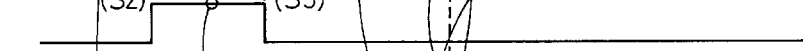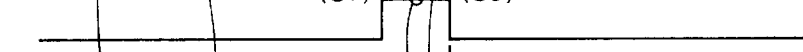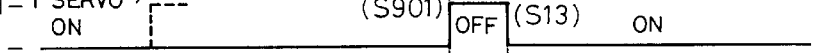

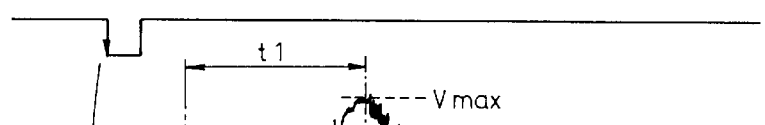
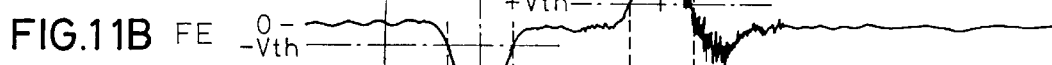
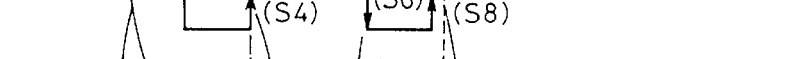
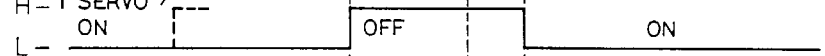
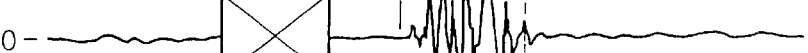

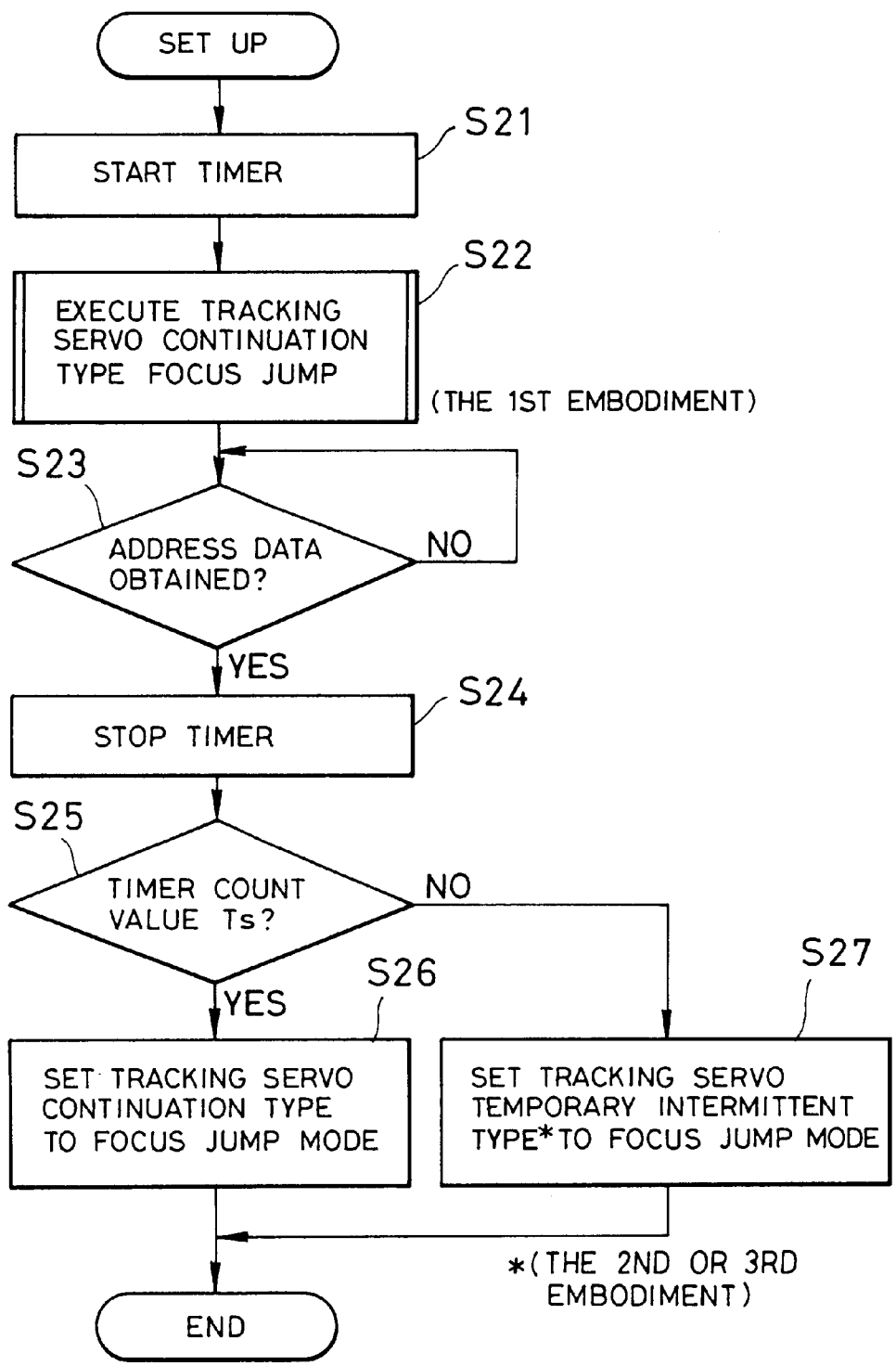

FOCUS JUMP CONTROL APPARATUS OF A PLAYER FOR MULTILAYER RECORDING DISC

BACKGROUND OF THE INVENTION

1. Field of the Invention

The present invention generally relates to a focus control apparatus of a player for playing a multilayer recording disc and, more particularly, to a focus control apparatus for controlling an optimum light converging position of a read light which is irradiated onto a predetermined recording surface of a disc for the recording surface.

2. Description of Related Art

Nowadays, an information recording medium of a high recording density and a large capacity called a digital video disc or a digital versatile disc (abbreviated as "DVD") and a system utilizing the medium are to be widely used. The DVD disc has a double-layer recording type in which information recording surfaces are formed on upper and lower two layers sandwiching an intermediate layer (spacer or space region). To read data by an optical pickup from one of the disc surface sides of the disc of such a type, a focal point (focal position or optimum light converging position) of read light has to be positioned on the information recording surface of a desired one of the layers.

Usually, a focus jumping operation for moving a focal point of read light from an information recording surface of one of the layers to an information recording surface of the other layer is executed based on a zero-cross point detection of a focusing error signal which is generated based on a photo-sensing output of a pickup.

Specifically, the pickup has a focusing actuator for displacing the focal point of read light in the direction perpendicular to the disc surface by displacing an objective lens which is, for example, a read light radiating optical system in the optical axial direction and determines the focal point. An acceleration signal as a focus jump activation signal for moving the focal point of the read light to a target recording surface is supplied to the focusing actuator in the initial stage of the focus jumping operation. On the basis of the timing of a zero-cross point which is sequentially detected from the focusing error signal obtained during the displacement of the focusing actuator in response to the acceleration signal, a series of operations for supplying a deceleration signal for finishing the supply of the acceleration signal or stopping the displacement of the focusing actuator in response to the acceleration signal to the focusing actuator and, further, for finishing the supply of the deceleration signal and restarting a focusing servo to the target recording surface is executed.

FIG. 1 shows a relationship between a position in a disc internal layer of a focal point P of read light which is determined by an objective lens 100 and a level FE of a focusing error signal obtained when the focal point P is moved in the optical axial direction in the case where a double-layer recording disc is read. It will be understood that the focusing error signal basically shows the zero level (zero-cross points ZC00 and ZC10) in a state where the focal point P is on the recording surface and draws an S-shaped curve around the zero level as a center. A period from the minimum value to the maximum value of one S-shaped curve generally corresponds to a control range of a focusing servo loop which is formed. Since the supply control of the acceleration and deceleration signals is executed during the focal point movement between one recording surface and the other recording surface, it is performed on the basis of detection timings of zero-cross points ZC00, ZC01, ZC1-1, and ZC10 of the focusing error signal as shown in the diagram.

Recording marks such as pits for showing an information signal are formed in a line like tracks on the recording surface. It is necessary to make the focal point of the read light trace the tracks in order to sequentially and correctly read the recording marks. For this purpose, a tracking servo is applied. For a disc such as the conventional compact disc (CD) in which an information recording surface is formed only on a single layer, a series of set-up operations is preformed in a manner such that an operation for allowing the focal point of the read light to approach the recording surface from a far position from a state where the focusing servo and the tracking servo are turned off, the focusing servo is applied in response to the arrival of the focal point at the recording position on the basis of the S-shaped curve of the focusing error signal, and after that, the tracking servo is exercised. This set-up operation is an operation for reading the disc again just after turn-on of a power source of a player, just after the loading of the disc into the player, or the like.

When the set-up operation which is a standard operation in the CD, however, is applied to the focus jumping operation of the DVD of the double-layer recording type, problems occur.

That is, the tracking error signal exerts an influence on the focusing error signal due to a crosstalk caused by a construction in which the focusing system and the tracking system are optically, electrically, and mechanically close to each other in the pickup. Especially, the tracking error signal when the tracking servo is off fluctuates more largely than a case where the tracking servo is on. Consequently, in a conventional focus jump executed with the tracking servo being turned off, there can be a case that the generated focusing error signal does not draw an ideal S-shaped curve as shown in FIG. 1.

In this case, due to the occurrence of a pseudo zero-cross point different from a desired zero-cross point, the supply control of the acceleration and deceleration signals cannot be correctly executed. Accordingly, the focusing actuator can be erroneously operated and it leads to a failure of the focus jumping operation.

SUMMARY AND OBJECTS OF THE INVENTION

The invention is made in consideration of the above drawbacks and it is an object to provide a focus jump control apparatus of a player for playing a multilayer recording disc which can certainly make a focus jumping operation succeed without erroneously operating a focusing actuator.

According to the invention, there is provided a focus jump control apparatus comprising: reading means for irradiating read light to a disc having information recording surfaces formed on at least two layers, respectively; a focusing servo loop for allowing an optimum light converging position of the read light to trace the recording surface in response to a focusing error signal generated on the basis of return light from the disc by using a focusing actuator for displacing the optimum light converging position of the read light in the optical axial direction; a tracking servo loop for allowing the optimum light converging position of the read light to trace tracks formed on the disc; and loop opening/closing control means for opening the focusing servo loop in response to an instruction and for closing the focusing servo loop when the movement of the optimum light converging position of the read light from one of the recording surfaces to the other is finished, wherein a closed state of the tracking servo loop is maintained during the movement of the optimum light converging position of the read light.

The focus jump control apparatus has jump driving means for generating a drive signal of the focusing actuator for moving the optimum light converging position of the read light from one of the recording surfaces to the other on the basis of the focusing error signal under the control in which the focusing servo loop is opened and the tracking servo loop is closed.

The drive signal can include an acceleration signal for accelerating and displacing the focusing actuator in the moving direction of the optimum light converging position of the read light.

The drive signal can also include a deceleration signal for decelerating the focusing actuator so as to stop the movement of the optimum light converging position of the read light.

According to the invention, there is provided a focus jump control apparatus comprising: reading means for irradiating read light to a disc having information recording surfaces formed on at least two layers, respectively; a focusing servo loop for allowing an optimum light converging position of the read light to trace the recording surface in accordance with a focusing error signal generated on the basis of return light from the disc by using a focusing actuator for displacing the optimum light converging position of the read light in the optical axial direction; and a tracking servo loop for allowing the optimum light converging position of the read light to trace tracks formed on the disc; and loop opening/closing control means for opening the focusing servo loop in response to an instruction and for closing the focusing servo loop when the movement of the optimum light converging position of the read light from one of the recording surfaces to the other is finished, wherein a closed closing state of the tracking servo loop is maintained for a predetermined period of time until a first timing during the movement of the optimum light converging position of the read light and, after that, the tracking servo loop is opened.

The focus jump control apparatus can also have jump driving means for generating an acceleration signal which accelerates and displaces the focusing actuator in the moving direction of the optimum light converging position of the read light from one of the recording surfaces to the other on the basis of the focusing error signal under the control in which the focusing servo loop is opened and the tracking servo loop is closed.

The first timing can be set to a timing where the optimum light converging position of the read light is away from a control range of the focusing actuator for one of the recording surfaces.

The apparatus further comprises detecting means for detecting a point where the focusing error signal has passed a predetermined level as a specific level cross point. The first timing can be also set to a timing after the elapse of a predetermined time from the detection timing of the specific level cross point after the optimum light converging position of the read light was away from a control range of the focusing actuator for one of the recording surfaces.

Further, the tracking servo loop is closed at a second timing and the second timing can be also set to a timing after a closing timing of the focusing servo loop.

The jump driving means can also generate a deceleration signal for decelerating the focusing actuator so as to stop the movement of the optimum light converging position of the read light subsequent to the acceleration signal.

According to the invention, there is provided a focus jump control apparatus comprising: reading means for irradiating read light to a disc having information recording surfaces formed on at least two layers, respectively; a focusing servo loop for allowing an optimum light converging position of the read light to trace the recording surface in accordance with a focusing error signal generated on the basis of return light from the disc by using a focusing actuator for displacing the optimum light converging position of the read light in the optical axial direction; and a tracking servo loop for allowing the optimum light converging position of the read light to trace tracks formed on the disc; and selecting means for selecting either one of a tracking servo continuation type focus jumping operation and a tracking servo temporary intermittent type focus jumping operation as an operation to be executed in a jumping mode, wherein the tracking servo continuation type focus jumping operation is the operation for opening the focusing servo loop in response to an instruction, for closing the focusing servo loop when the movement of the optimum light converging position of the read light from one of the recording surfaces to the other is finished, and for maintaining the closing state of the tracking servo loop during the movement of the optimum light converging position of the read light. The tracking servo temporary intermittent type focus jumping operation is the operation for opening the focusing servo loop in response to an instruction, for closing the focusing servo loop when the movement of the optimum light converging position of the read light from one of the recording surfaces to the other is finished, for maintaining the closing state of the tracking servo loop for a predetermined period of time until a first timing during the movement of the optimum light converging position of the read light, and for subsequently opening the tracking servo loop.

The focus jump control apparatus further comprises detecting means for detecting a deviation between the track formed on one of the recording surfaces and the track formed on the other recording surface. The selecting means can select either one of the tracking servo continuation type focus jumping operation and the tracking servo temporary intermittent type focus jumping operation in accordance with a detection result of the detecting means.

The detecting means executes the tracking servo continuation type jumping operation at the time of set-up, detects that a predetermined signal is obtained from a read signal, counts a time from a predetermined time point until a time point when the predetermined signal is obtained, compares the count time with a reference value, allows the selecting means to select the tracking servo continuation type focus jumping operation when the count time is smaller than the reference value, and allows the selecting means to select the tracking servo temporary intermittent type focus jumping operation when the count time is equal to or larger than the reference value.

BRIEF DESCRIPTION OF THE DRAWINGS

FIGS. 7A to 7I are time charts showing waveforms of outputs from the respective sections in the focus jump control apparatus when the focus jump operating process in FIG. 3 is performed to a disc in which a track slide occurs;

FIG. 8 is a flowchart showing a procedure of the focus jump operating process which is executed in a focus jump control apparatus in the second embodiment according to the invention;

FIGS. 9A to 9I are time charts showing waveforms of outputs from respective sections in the focus jump control apparatus in the focus jump operating process in FIG. 8;

FIGS. 11A to 11I are time charts showing waveforms of outputs from the respective sections in the focus jump control apparatus in the focus jump operating process in FIG. 10;

FIG. 12 is a flowchart showing a procedure of a set-up process which is executed in a focus jump control apparatus in the fourth embodiment according to the invention.

DETAILED DESCRIPTION OF THE PREFERRED EMBODIMENTS

Embodiments of the invention will now be explained in detail hereinbelow with reference to the drawings.

Figure 2:
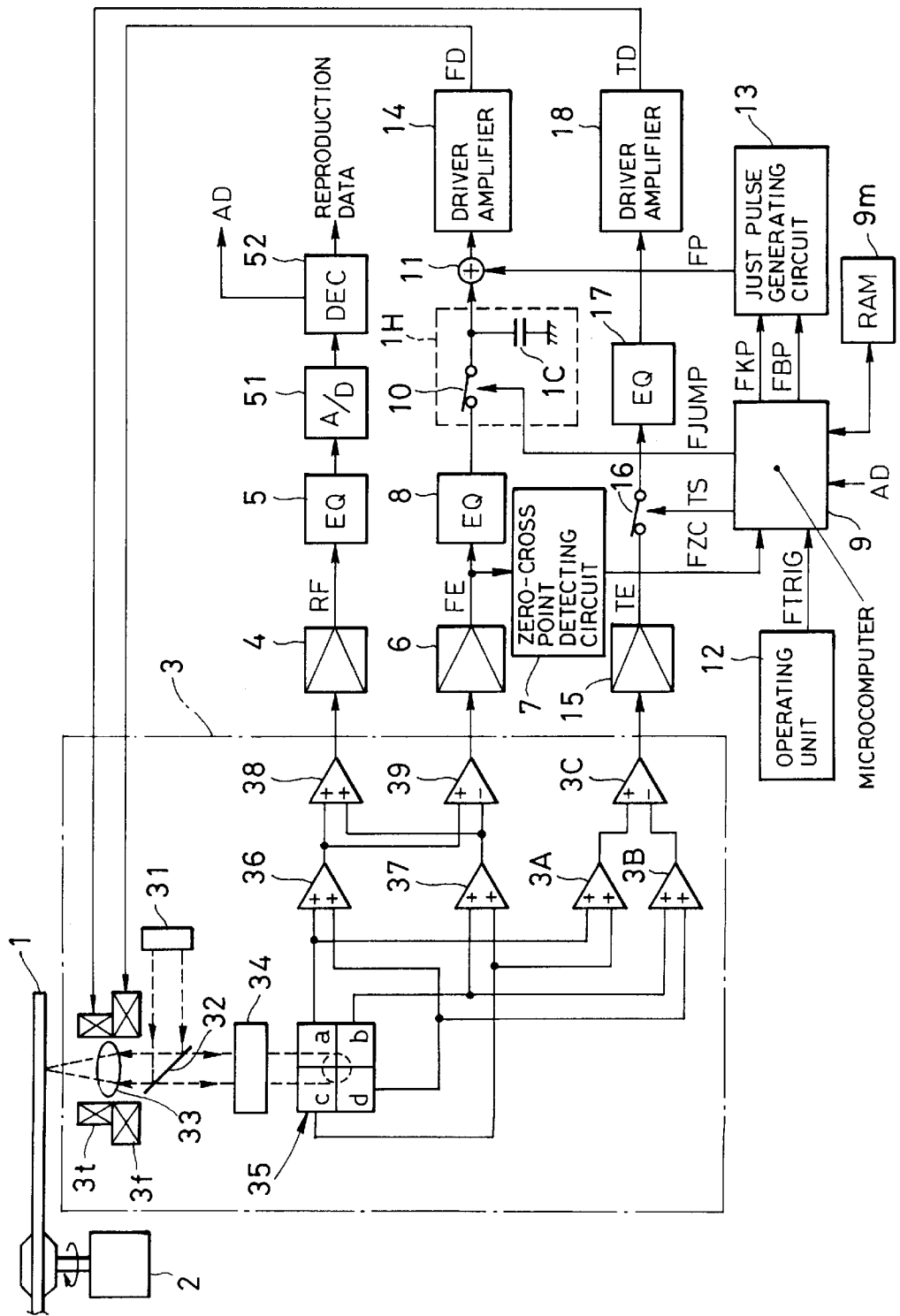
FIG. 2 is a block diagram showing a schematic construction of an optical disc player to which a focus jump control apparatus of an embodiment according to the invention is applied.

FIG. 2 shows a schematic construction of an optical disc player using a focus jump control apparatus of the first embodiment of the invention.

In FIG. 2, a double-layer recording disc 1 loaded in a player is rotated by a spindle motor 2. A read light generated from a pickup 3 is irradiated to the rotating disc 1. The read light reaches a recording surface through a protecting layer of the disc 1, is modulated by what is called a recording mark holding recording information such as pits or the like formed on the recording surface, and is returned to the pickup 3 as a reflection light from the recording surface.

The pickup 3 not only generates the read light but also executes a photoelectric conversion such that the reflection light from the disc 1 is received and various electric signals according to a light amount and/or a state of the reflection light are generated. An optical system of the pickup 3 is constructed by: a read light emitting system 31 including, for example, a laser diode as a light source; a beam splitter 32 for reflecting read light emitted from the read light emitting system; an objective lens 33 for converging the reflected read light onto the recording surface of the disc 1 and for guiding the return light from the disc to the beam splitter 32; an astigmatism applying optical system 34 such as a cylindrical lens or the like for applying an astigmatism to the return light passed through the beam splitter 32; and a 4-split photodetector 35, as shown in the diagram, for receiving the return light transmitted through the optical system 34. A photo-sensing surface of the 4-split photodetector 35 has four photo-sensing units a, b, c, and d partitioned by two straight lines which perpendicularly cross at the photo-sensing center and is arranged in a manner such that one of the straight lines (in this instance, the straight line corresponding to the boundary between the photo-sensing units a and c and photo-sensing units b and d) is parallel with the track tangential direction of the disc 1.

A read signal [what is called an RF (Radio Frequency) signal] mainly having a signal component according to recording information of the disc 1 can be obtained by the sum of photoelectric conversion signals by the photo-sensing units a, b, c, and d. Specifically speaking, adding circuits 36 and 37 for adding the photoelectric conversion signals of the photo-sensing units (a and d, b and c) which are symmetrically located with respect to the photo-sensing center in the photo-sensing surface of the photodetector 35 and an adding circuit 38 for further adding both of output signals of the adding circuits are provided. A read signal is formed by using an output [(a+d)+(b+c)] of the adding circuit 38 at the final stage. The read signal can be also formed by other various well-known methods.

A focusing error signal mainly corresponding to an error of an optimum light converging position of the read light for the recording surface of the disc 1 is obtained in a manner such that, on the basis of a principle that the reflection light changes its shape and intensity on the photo-sensing surface of the photodetector 35 in accordance with a focal state of the read light for the recording surface of the disc, photoelectric conversion signals of the photo-sensing units (a and d, b and c) which are symmetrically located with respect to the photo-sensing center are added and a difference between two addition signals obtained by the addition. That is, the focusing error signal is formed by an output [(a+d)−(b+c)] of a subtracting circuit 39 for subtracting output signals of the adding circuits 36 and 37. The focusing error signal can be also formed by other various well-known methods.

A tracking error signal mainly corresponding to an error of the optimum light converging position of the read light for tracks formed on the recording surface of the disc 1 can be obtained on the basis of a difference of photo-sensing levels between photo-sensitive areas partitioned by a straight line which is parallel with the track tangential direction. Specifically speaking, an adding circuit 3A for adding the photoelectric conversion signals of one pair of photo-sensing units a and c partitioned by the straight line which is parallel with the track tangential direction on the photo-sensing surface of the photodetector 35, an adding circuit 3B for adding the photoelectric conversion signals of another pair of photo-sensing units b and d, and a subtracting circuit 3C for subtracting both output signals of those adding circuits are provided. The tracking error signal is formed by using an output [(a+c)−(b+d)] of the subtracting circuit 3C of the final stage. Besides the forming method of the tracking error signal, there are a 3-beam method and the like.

A focusing actuator 3f for allowing the objective lens 33 to irradiate the read light emitted from the light source onto the disc 1 to be moved in the optical axial direction is also built in the pickup 3. The focusing actuator 3f displaces the objective lens 33 in the direction perpendicular to the surface of the disc 1 in accordance with a level and a polarity of a drive signal, which will be described later. A tracking actuator 3t for moving the irradiating position of the read light by the objective lens 33 in the radial direction of the disc 1 is further built in the pickup 3. The tracking actuator 3t displaces the irradiating position on the disc recording surface of the read light in accordance with the level and polarity of the drive signal, which will be described later.

It should be noted that it is possible to understand that a crosstalk which is, particularly, considered as a special problem in the invention is usually caused because the invention uses a construction such that the focusing system and the tracking system in the pickup 3 are optically, electrically, and mechanically close to each other as will be understood from FIG. 2. In addition to the construction shown in FIG. 2, there is also a construction in which an electronic circuit such as an adding circuit or the like is not included in the pickup. Although this construction can be used in the embodiment as well, it is not an essential solution of the occurrence of the crosstalk. In the embodiments shown in the specification, even when any pickup in which the crosstalk easily occurs is used, a good focus jumping operation can be executed.

The read signal formed as mentioned above is amplified by an RF amplifier 4 and, after that, the signal is transmitted to an analog/digital (A/D) converter 51 through an equalizer 5. The A/D converter 51 converts the transmitted read signal to a digital signal and transfers the converted signal to a decoder 52. In this instance, the decoder is used for a DVD, executes a predetermined decoding process to the transferred digital signal, and generates reproduction data. The reproduction data is transmitted to a data processing system (not shown) at the post stage. The data processing system includes a digital/analog (D/A) converter and/or a predetermined interface circuit, obtains final audio or video signal or a computer data signal from the reproduction data, and supplies the reproduction signal to, for example, the outside of the player. Address data AD indicative of a physical address of, for example, the disc 1 is included in an output of the decoder 52. The address data AD is transferred to a microcomputer 9 in order to realize an embodiment that will be described later.

The focusing error signal derived from the subtracting circuit 39 as an output stage of the pickup 3 is supplied to an error amplifier 6. A focusing error signal FE amplified by the amplifier 6 is supplied to a zero-cross point detecting circuit 7 and an equalizer 8.

The zero-cross point detecting circuit 7 detects that a level of the focusing error signal FE has passed a predetermined level, in the embodiment, the zero level, generates a zero-cross point detection signal FZC according to a detection result, and supplies it to the microcomputer 9. A detailed detection principle of the zero-cross point detecting circuit 7 and a detailed state of the zero-cross detection signal FZC will be described later.

The equalizer 8 executes an equalizing process to the supplied focusing error signal FE and supplies the equalized focusing error signal to an input terminal of a loop switching circuit 10. An output terminal of the loop switching circuit 10 is connected to the ground via a capacitor 1C and is also connected to one end of an adder 11. The switching circuit 10 and capacitor 1C forms a holding circuit 1H is constructed. The switching circuit 10 is on/off controlled in accordance with a focus jump status signal FJUMP from the microcomputer 9. When the status signal FJUMP indicates that a focusing servo loop should be closed, therefore, the switching circuit 10 is turned on and generates the focusing error signal from the equalizer 8 to the adder 11 at the post stage. When the status signal FJUMP indicates that the focusing servo loop should be opened during the jumping operation, the switching circuit 10 is turned off, shuts off the focusing error signal, and transfers an accumulation level in the capacitor 1C to the adder 11. The capacitor 1C holds the level of the focusing error signal from the equalizer 8 just before the jumping operation of the focal position of the read light and supplies a signal to form an initial level of a drive signal FD of the focusing actuator 3f during the jumping operation (for a period of time while the focusing servo loop is opened) to the adder 11.

When the loop switching circuit 10 is OFF, an actuating signal or the focusing error signal FE as a control error is not supplied to a driver amplifier 14 through the adder 11. A feedback control for performing a correcting operation such as to compare a value of a control amount with a target value by a feedback and to make them coincide is cancelled. Therefore, the apparatus does not operate as a servo as one of the feedback controls as well. With respect to the tracking system, in a manner similar to the above, a state where the feedback control is cancelled is expressed as "servo off" and a state where the feedback control is performed is expressed as "servo on".

Although the microcomputer 9 executes various controls and processes in the player, with respect to the operation to jump the focal position of the read light from one recording surface to another recording surface (hereinafter, abbreviated to a jumping operation), a process corresponding to a jumping mode is executed in response to a jump instruction signal from an operating unit 12 serving as instructing means. In the jumping mode, at least two kinds of modes can be set in an embodiment, which will be explained later. For the mode setting process and another storing process, the microcomputer 9 has an RAM (random access memory) 9 m and can access the RAM 9 m at any time as necessary. In the embodiment, which will be explained later, the jumping mode is set by using the address data AD from the decoder 52. The details will be clarified later.

In the jumping mode, on the basis of the zero-cross point detection signal FZC, the microcomputer 9 generates a kick pulse FKP for accelerating the focusing actuator 3f and displacing in a predetermined direction, a brake pulse FBP for decelerating the focusing actuator 3f during the displacement by the kick pulse and stopping the displacement in the predetermined direction, and the jump status signal FJUMP. Both of the pulses FKP and FBP are supplied to a jump pulse generating circuit 13. The status signal FJUMP is supplied to a control input terminal of the switching circuit 10.

On the basis of the kick pulse FKP and brake pulse FBP, the jump pulse generating circuit 13 forms a jump pulse FP by synthesizing those pulses while giving a corresponding polarity and supplies to the adder 11.

The adder 11 adds the signal from the holding circuit 1H and the jump pulse FP and supplies an addition output to the driver amplifier 14. The driver amplifier 14 generates the drive signal FD according to an output of the adder 11 and supplies to the focusing actuator 3f. Upon closing of the focusing servo loop in which the switching circuit 10 is turned on and the output signal of the equalizer 8 is relayed, the focusing actuator 3f is driven so that the level of the focusing error signal FE is set to zero, namely, the focal position of the read light traces the recording surface. On the other hand, upon opening of the focusing servo in which the switching circuit 10 is turned off and the holding signal by the capacitor 1C is supplied to the adder 11, the focusing actuator 3f is driven so that the focal position of the read light is forcibly moved to the target recording surface in response to the jump pulse FP.

The tracking error signal which is derived from the subtracting circuit 3C serving as output stage of the pickup 3 is supplied to an error amplifier 15, so that a tracking error signal TE amplified by the error amplifier 15 is supplied to an equalizer 17 through a loop switching circuit 16. The switching circuit 16 is on/off controlled in response to a tracking servo loop control signal TS from the microcomputer 9. When the control signal TS indicates that the tracking servo loop should be closed, therefore, the switching circuit 16 is turned on and transfers the tracking error signal TE from the error amplifier 15 to the equalizer 17 at the post stage. When the control signal TS shows that the tracking servo loop should be opened, the switching circuit 16 is turned off and shuts off the tracking error signal TE.

The equalizer 17 executes a waveform equalizing process to the supplied tracking error signal TE and supplies the equalized tracking error signal to a driver amplifier 18. The driver amplifier 18 generates a drive signal TD according to an output of the equalizer 17 and supplies to the tracking actuator 3t. The switching circuit 16, thus, is turned on and the tracking actuator 3t is driven in a manner such that when the tracking servo loop to relay the output signal of the error amplifier 15 is closed, the level of the tracking error signal TE is set to zero, namely, the focal position of the read light traces the tracks formed on the recording surface.

In the jump operating mode, the microcomputer 9 generates the loop control signal TS in a manner as will be explained later. This manner corresponds to one of the major features of the embodiment.

A focus jumping process which is executed by the microcomputer 9 and the manner of the operation of each section will now be described.

Figure 3:
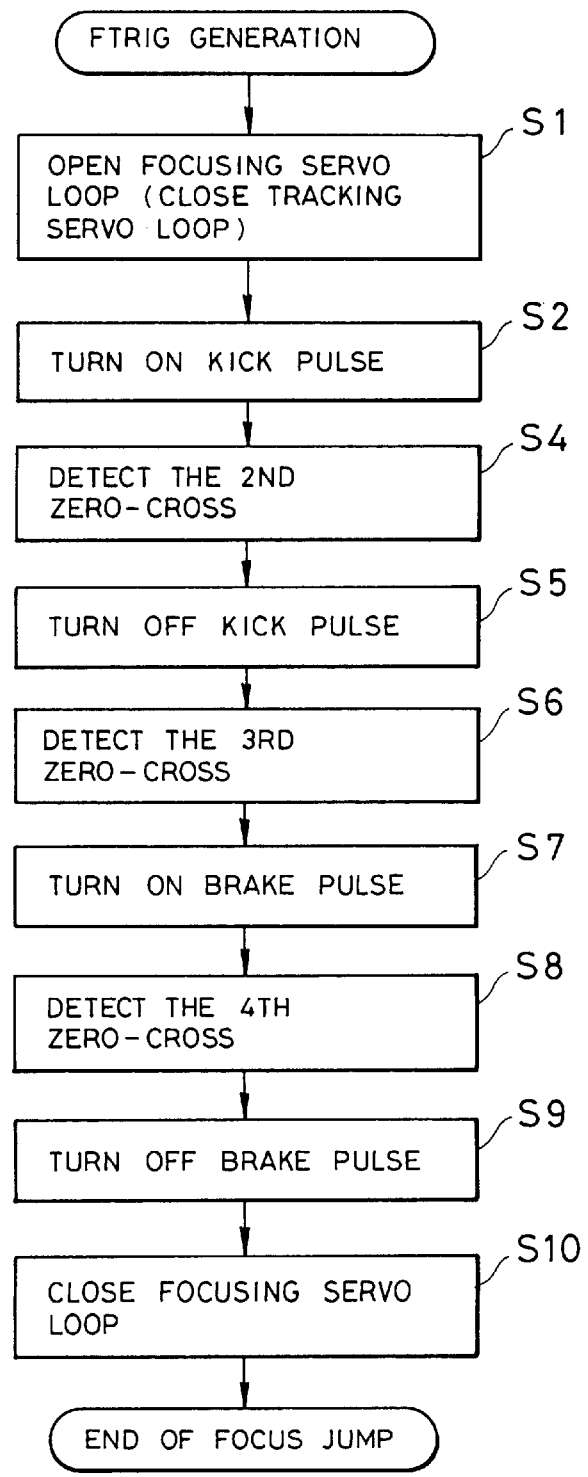
FIG. 3 is a flowchart showing a procedure of a focus jump operating process which is executed by a microcomputer in the player in FIG. 2.
Figure 4:
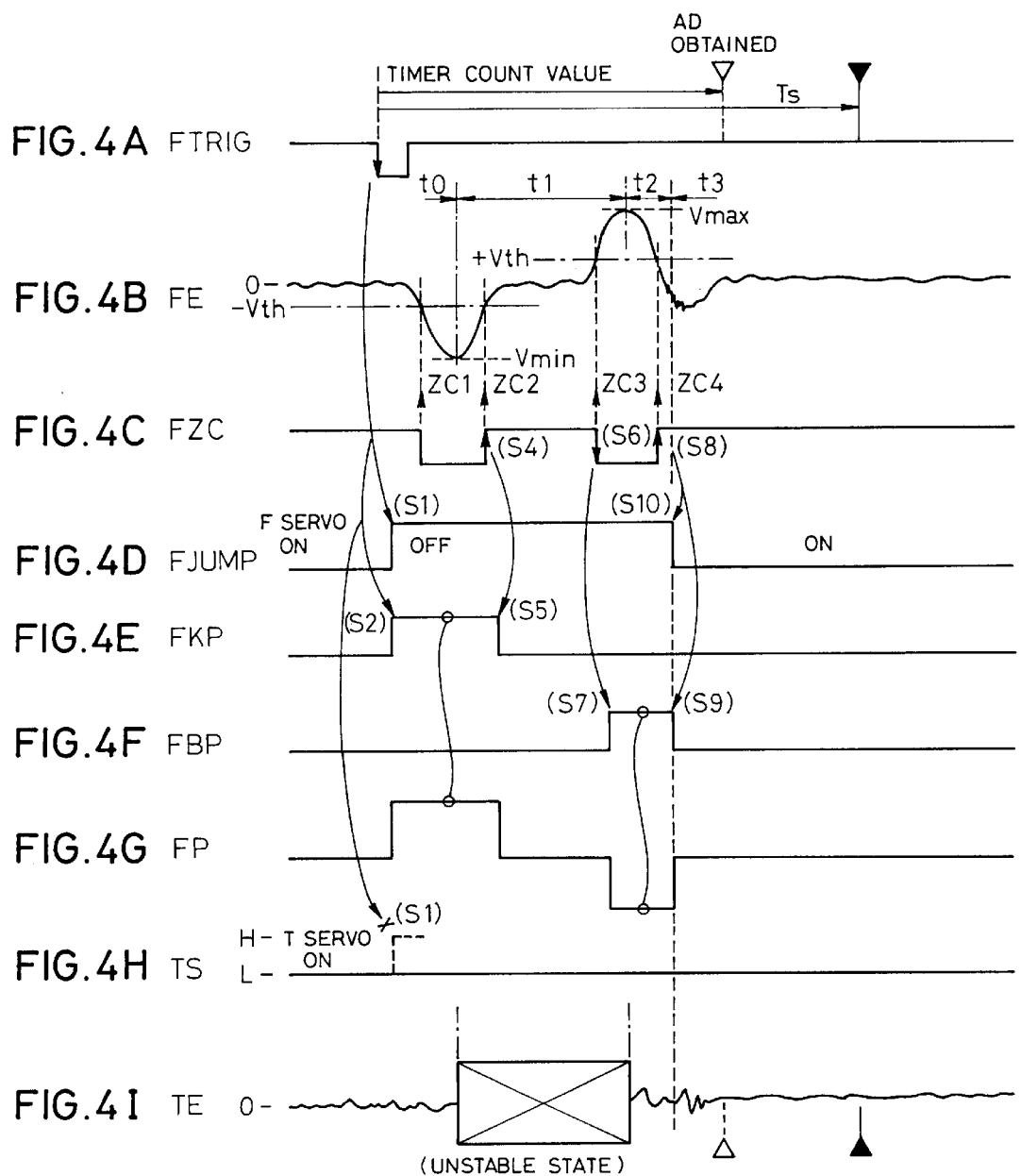
FIGS. 4A to 4I are time charts showing waveforms of outputs from respective sections in the focus jump control apparatus in the focus jump operating process in FIG. 3.
Figure 5:
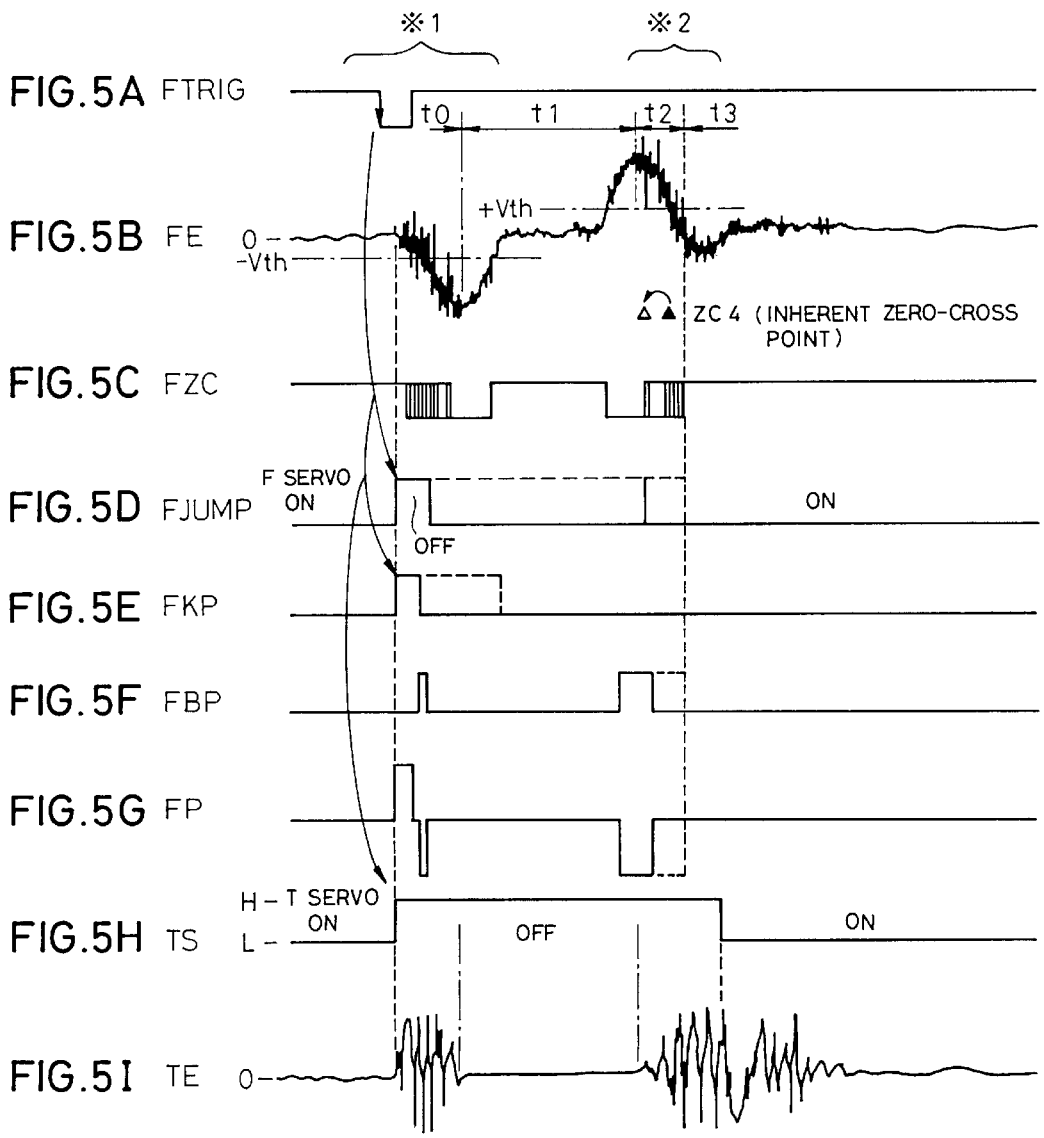
FIGS. 5A to 5I are time charts showing waveforms of outputs from respective sections in a focus control apparatus in the focus jumping operation when a tracking servo is turned off during a focus jump.

FIG. 3 shows a procedure of the focus jumping process. FIGS. 4A to 4I show waveforms of output signals from respective sections in FIG. 2.

During the reading operation of one recording surface, for example, when a focus jump instruction signal FTRIG to move the focal position of the read light to another recording surface is received from the operating unit 12, the microcomputer 9 interrupts the process which has been executed so far and first opens the focusing servo loop (step S1). Specifically speaking, by raising the jump status signal FJUMP, the switching circuit 10 is controlled so as to shut off the output of the focusing error signal from the equalizer 8 and to supply the output signal of the capacitor 1C to the adder 11. It is a further important point that the tracking servo is continued in step S1. That is, the microcomputer 9 sets the loop control signal TS to the low level or continues in response to the focus jump instruction signal FTRIG, turns on the loop switching circuit 16, and closes the tracking servo loop. The focusing error signal, consequently, in which the crosstalk of the relevant waveform by the tracking error signal is fairly reduced is derived.

The microcomputer 9 also raises the kick pulse FKP in response to the jump instruction signal FTRIG (step S2).

Since the jump pulse generating circuit 13, therefore, generates the jump pulse FP having a high level of a positive polarity corresponding to the kick pulse, the adder 11 adds the high level of the positive polarity shown by the jump pulse FP and the error holding level from the holding circuit 1H and generates the added level. The drive signal FD corresponding to the addition output is supplied from the driver amplifier 14 to the focusing actuator 3f. In the generation period of time of the kick pulse FKP, therefore, the actuator 3f is forcibly accelerated in such a direction as to move the focal position of the read light to the recording surface which will become a new target. In association with it, as the focal position of the read light is away from the recording surface which has been traced so far, the absolute value of the level of the focusing error signal FE increases and shows a change of a valley shape such that after it reached the minimum value (refer to Vmin in FIG. 4B), it is again returned to the zero level.

The microcomputer 9 monitors the zero-cross point detection signal FZC which is generated on the basis of the focusing error signal FE showing the above change and detects the leading edge, namely, a second zero-cross point ZC2 of the focusing error signal FE (step S4).

The zero-cross point detecting circuit 7 detects the zero-cross point of the focusing error signal FE as mentioned above. That is, with respect to the negative polarity level of the focusing error signal FE, the occurrence of the zero-cross is detected when the level transverses a predetermined threshold value −Vth. As for the positive polarity level of the focusing error signal FE, the occurrence of the zero-cross is detected when the level transverses a predetermined threshold value +Vth. Values which can be determined such that the focusing error signal FE is largely away from a level near the zero level and that it has reached a level that is sufficiently near the zero level from a relatively large absolute value level are set as the absolute values of the threshold values −Vth and +Vth. Actually, it is detected that the focusing error signal FE passes through a predetermined voltage width.

When the second zero-cross point ZC2 is detected in step S4, the microcomputer 9 trails the kick pulse FKP (step S5). Since the jump pulse generating circuit 13, therefore, trails the output jump pulse FP to the zero level, the adder 11 obtains the addition output of the level in which the zero level shown by the jump pulse FP and the initial bias level from the holding circuit 1H are added, accordingly, the output holding level of the level holding circuit 1H. In association with it, although the drive signal FD whose level suddenly dropped is supplied from the driver amplifier 14 to the focusing actuator 3f, since there is an inertia moment of the driving due to the kick pulse FKP generated before, the focusing actuator 3f continues the displacement to move the focal position of the read light to the target recording surface although the velocity is reduced.

After that, the microcomputer 9 monitors the zero-cross point detection signal FZC and detects the trailing edge (step S6). This process corresponds to the detection of a third zero-cross point ZC3. Before entering the focus control range (refer to FIG. 1) for the target recording surface, the focusing error signal FE exceeds the threshold value +Vth and the third zero-cross point ZC3 is detected.

When the third zero-cross point ZC3 is detected, the microcomputer 9 raises the brake pulse FBP (step S7). The jump pulse generating circuit 13, therefore, further trails the output jump pulse FP to the low level of the negative polarity, the adder 11 supplies the addition output of the level in which the low level shown by the jump pulse FP and the holding level from the holding circuit 1H are added to the driver amplifier 14. In association with it, the drive signal FD to stop the movement of the focal position of the read light so far to the target recording surface is supplied to the focusing actuator 3f. The focusing actuator 3f gradually decreases the displacement velocity.

In the decelerating step of the actuator, the microcomputer 9 monitors the zero-cross point detection signal FZC and detects the leading edge (step S8). This process corresponds to the detection of a fourth zero-cross point ZC4. As the focal point of the read light approaches the target recording surface from the position corresponding to the third zero-cross point ZC3, the level of the focusing error signal FE increases. After it passed through the maximum value (refer to Vmax in FIG. 4B), the level gradually decreases on the contrary. When the focal point of the read light just reaches the target recording surface, the level reaches the zero level, so that the fourth zero-cross point ZC4 is detected.

When the fourth zero-cross point ZC4 is detected, the microcomputer 9 trails the brake pulse FBP (step S9), trails the jump status signal FJUMP and closes the focusing servo loop (step S10). The jump pulse generating circuit 13, therefore, raises the output jump pulse FP to the zero level. The switching circuit 10 is controlled so as to relay the focusing error signal from the equalizer 8 to the driver amplifier 14 through the adder 11. After that, the focusing actuator 3f executes a stationary focusing servo operation for allowing the focal position of the read light to trace the target recording surface on the basis of the focusing error signal FE.

The focus jumping operation is finished in this way and the microcomputer 9 shifts to, for instance, the mode to reproduce the recording information on the target recording surface.

It is a feature of the focus jumping operation according to the embodiment that the focus jump is performed in a state where the tracking servo loop is closed, namely, in a state where the tracking servo is performed. In a period of time t0 when the focal point of the read light lies within the focus control range of the original recording surface, since the focal point of the read light traces the tracks on the original recording surface, the level of the tracking error signal TE is held at a level near zero. Since the level of the tracking error TE in this period, therefore, is stable, the crosstalk due to the tracking error TE does not occur in the focusing error signal FE.

In a period of time t1 until the focal point of the read light enters the focus control range of the target recording surface after the period t0, since the intensity of the return light is small in a state where the focal point of the read light is moving between the first and second recording surfaces, the tracking error signal TE becomes unstable. There is, however, a case where the level of the tracking error signal TE becomes stable in dependence on the disc. In this case, the crosstalk occurring in the focusing error signal FE is small. The unstable state of the tracking error signal TE will be explained in detail later.

After the period t1, further, since the focal point of the read light enters the focus control range of the target recording surface and the focal point of the read light is allowed to trace the tracks on the target recording surface, the level of the tracking error signal TE is converged to zero. The level of the tracking error signal TE, therefore, in this period is also relatively stabilized and the crosstalk in the focusing error signal FE due to the tracking error TE is not so large.

Figure 1:
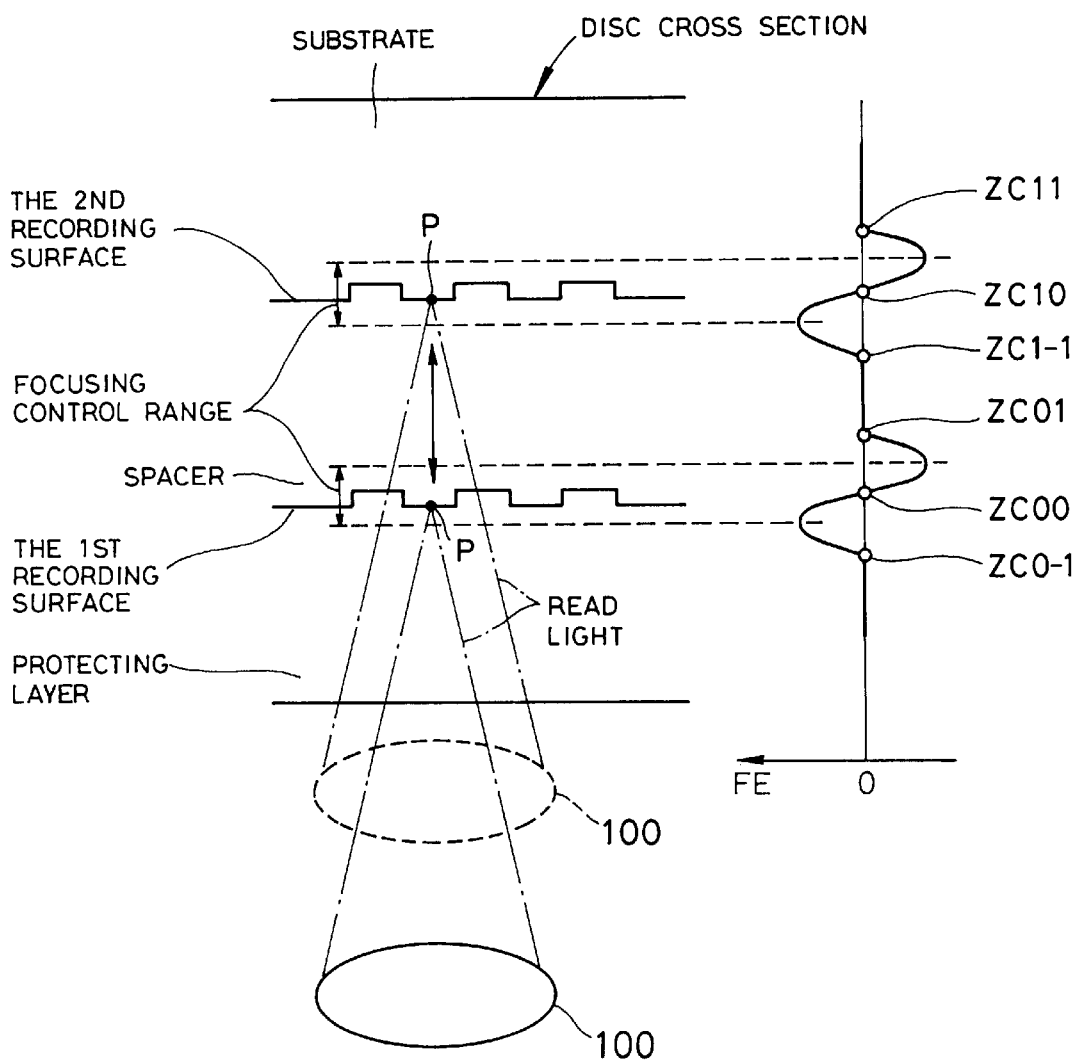
FIG. 1 is a diagram showing a relation between a position of a focal point of a read light in a disc internal layer in the normal focus jumping operation and a level of a focusing error signal obtained when the focal point moves in the optical axial direction in a double-layer recording disc.

Since the serial of focus jumping operation can be substantially executed in a situation such that the crosstalk is hardly mixed in the focusing error signal FE, it is possible to prevent the focusing error signal FE from exhibiting an abnormal zero-cross different from a desired zero-cross due to the S-shaped curve as shown in FIG. 1. The kick pulse FKP serving as an acceleration signal or the brake pulse FBP serving as a deceleration signal, therefore, can be correctly generated without exerting an influence by the crosstalk on the zero-cross point detection signal FZC, so that it can contribute to a purpose for certainly making the jumping operation to the target recording surface successful.

To clearly describe the functions and effects as mentioned above, FIGS. 5A to 5I show output waveforms in respective sections in the case where the focus jump is performed in an opening state of the tracking servo loop in a manner similar to the conventional method.

In this case, when the loop control signal TS is set to the high level and the tracking servo loop is opened, the tracking error signal TE immediately starts to show a large level fluctuation. This is because of a dynamic eccentricity of the tracks formed on the disc recording surface as mentioned above. In more detail, the dynamic eccentricity denotes a phenomenon such that the relative position of the track on the recording surface for the irradiation spot on the disc recording surface of the read light fluctuates with the elapse of time. As the reason of this phenomenon, the following two causes can be conceivable: namely, a first cause that the track itself is excentric from the rotational axis of the disc on the disc recording surface, and a second cause that, when the disc is rotated, the rotational axis in the rotation driving mechanism is deviated from the disc center.

In association with the level fluctuation of the tracking error signal TE, from the start of the focus jumping operation, the trailing edge and leading edge of the zero-cross point detection signal FZC sequentially appear in a short time. On the microcomputer side, therefore, the kick pulse FKP is finished by the leading edge of the zero-cross point detection signal FZC. The brake pulse FBP is generated and extinguished by the trailing edge and leading edge of the zero-cross point detection signal FZC which is generated immediately after that. The jump pulse FP obtained as mentioned above eventually has a waveform such that the pulse width of the kick pulse portion is extremely short, an interval between the kick pulse portion and the brake pulse portion is also extremely short, and a pulse width of the brake pulse portion is also fairly short. The focusing actuator 3f to which the drive signal according to the jump pulse is supplied cannot perform a displacement until the focal position of the read light is allowed to approach the target recording surface, so that the jumping operation ends in failure. (Refer to *1 in FIGS. 5A to 5I.)

Even if the crosstalk just after the start of the focus jumping operation does not occur in the focusing error signal FE and the kick pulse FKP is accurately generated, since the crosstalk of the tracking error signal TE which also causes a similar large level fluctuation after a period of time t2 is mixed into the focusing error signal FE, the leading edge of the zero-cross point detection signal FZC corresponding to the fourth zero-cross point ZC4 appears early. The brake pulse is extinguished early. There is also a possibility that the focusing servo is turned on fairly before the focal position of the read light reaches the target recording surface. The jump pulse FP derived as mentioned above, consequently, has a waveform in which the pulse width of the brake pulse portion is also short. Moreover, the focusing servo is performed at a too early timing. It takes long time until the settlement of the servo. (Refer to *2 in FIGS. 5A to 5I.)

On the other hand, in the embodiment, the tracking servo is performed or continued from the start of the focus jumping operation. The jumping operation is executed in a situation where the crosstalk is hard to be mixed to the focusing error signal FE, thereby allowing proper kick pulse and brake pulse to be generated and accomplishing the certain jumping operation to the target recording surface.

There is a possibility that a similar abnormal zero-cross also occurs even at a point near the fourth zero-cross point ZC4 of the focusing error signal FE after the period of time t2 in the embodiment. Even if the erroneous zero-cross point is detected, however, and the trailing timings of the jump status signal FJUMP and brake pulse FBP are disturbed, since the timing to close the focusing servo loop is made early, the focal point of the read light can be made arrive at the target recording surface. There is no large influence as a whole focus jumping operation.

According to the embodiment described above, the preferable focus jumping operation is realized under a condition that when the focal position of the read light reaches a position near the target recording surface and the focusing servo is performed, there is no large interval between the track which was formed on the original recording surface and is a target where the read light traces and the track which was formed on the target recording surface and newly becomes a target where the read light traces as a prerequisite.

Figure 6:
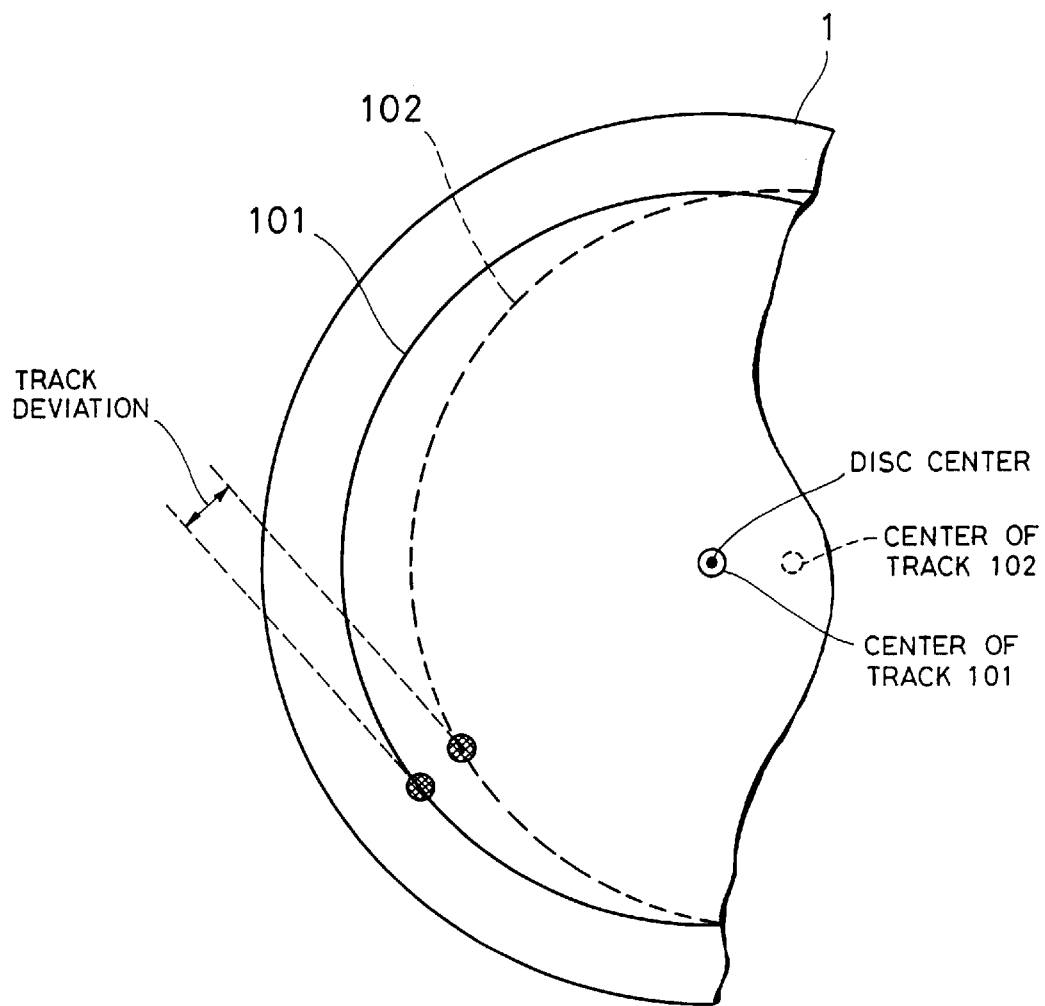
FIG. 6 is a schematic diagram for explaining a track deviation between information recording surfaces in the double-layer recording disc.

Actually, however, as shown in FIG. 6 as a perspective view seen from the flat surface of the disc 1, for example, there is a case where a focus jumping instruction is generated during the reading operation of a certain track 101 on the first recording surface and the pickup is jumped to the second recording surface, so that a track 102 that is the closest in the disc radial direction to the focal point of the read light which has reached the second recording surface is away from the track 101 in the disc radial direction by a large distance. This phenomenon is what is called a "track deviation" of the recording surfaces and the track deviation often exists in DVDs which are formed by joining the layer holding the first recording surface and the layer holding the second recording surface. In more detail, for instance, as shown in FIG. 6, in many cases, even if the center of the track 101 of the first recording surface on the jump source side coincides with the disc center, the center of the track 102 on the second recording surface on the jump destination side is largely deviated from the disc center. It is forecasted that there is a deviation on the order of 100 [μm].

When there is no track deviation on the disc, the track on the jump source side and the track on the jump destination side are located at almost the same position in the disc radial direction. As shown in FIGS. 4A to 4I, when the focal point of the read light reaches a position near the target recording surface, since the focal point of the read light is substantially matched with the track on the target recording surface, the tracking error signal TE is not largely deviated from the zero level.

On the contrary, in the case where the track on the jump source side and the track on the jump destination side are located at positions which are largely different in the disc radial direction, when the focal point of the read light reaches a position near the target recording surface, the focal point of the read light is largely away from the track on the target recording surface. If the tracking servo was performed as in the above embodiment in this instance, therefore, the tracking actuator 3t has to be driven so as to give a large displacement so that the focal point of the read light immediately traces the remote track on the target recording surface. The tracking actuator 3t, therefore, is forced to be subjected to a relatively sudden displacement. As shown in FIGS. 7A to 7I, the tracking error signal TE causes a large level fluctuation by the above displacement ("track slide"). The typical fluctuation of the tracking error signal TE, consequently, continues for a long time after the turn-on of the focusing servo, the tracking servo for the tracks on the target recording surface becomes unstable, the error signal TE is converged to a point near zero, and it takes fairly long time until the tracking servo is stabilized. In the worst case, there occurs a situation that the tracking servo is perfectly out of the control range and the tracking actuator 3t cannot be controlled.

To cope with it, as shown in FIG. 7H, it is necessary that the tracking servo loop control signal TS is once set to the high level, the tracking servo loop is temporarily opened, the tracking actuator 3t is returned to the neutral position, the apparatus is returned to a state where a normal error signal is derived, and after that, the tracking servo is again turned on (therefore, the control signal is set to the low level).

On the other hand, there is also a possibility that the unstable state of the tracking error signal TE in the period t1 causes similar impossibility of the tracking servo. Even in such a case, the control of the tracking servo loop is necessary.

The second embodiment according to the invention, which will be explained hereinbelow, intends to cope with the track slide.

FIG. 8 shows a procedure for a focus jumping process which is executed by the microcomputer 9 in a focus jump control apparatus according to the second embodiment. FIGS. 9A to 9I show modes of the operations in the respective sections corresponding to the procedure. The focus jump control apparatus has a fundamental construction similar to that in FIG. 2, namely, its hardware is similarly constructed.

The processes shown in FIG. 8 differ from the processes shown in FIG. 3 with respect to a point that the tracking servo loop is opened (step S901) before step S10 to turn on the focusing servo and a point that the focus jump is finished through a procedure such that when a predetermined time ta elapses from the opening of the tracking servo loop (step S12), the tracking servo loop is closed (step S13). The opening of the tracking servo loop in step S901 is accomplished by generating the control signal TS so as to turn off the switching circuit 16 in response to the fourth zero-cross point ZC4 of the focusing error signal FE shown by the leading edge of the zero-cross point detection signal FZC. The closure of the tracking servo loop in step S13 is accomplished by generating the control signal TS so as to turn on the switching circuit 16 after the elapse of the predetermined time. The elapsed time ta from the opening timing of the tracking servo loop is measured by a timer built in the microcomputer 9.

FIGS. 9A to 9I show modes such that the control signal TS is set to the high level for the predetermined time ta from a timing just before the start of the focusing servo for the target recording surface and the tracking servo is temporarily turned off as mentioned above. Since the tracking servo is turned off for the predetermined time ta from the timing just before the focusing servo is restarted on the target recording surface, even if there is a track deviation, the time which is required from the restart of the focusing servo to the convergence of the tracking error signal TE to a point near zero is shorter than that in case of FIGS. 7A to 7I and it is guaranteed that the time lies within an almost constant time.

The following third embodiment relates to a further modification of the second embodiment and copes with not only the track slide but also the unstable state of the tracking error signal TE mentioned above.

Figure 10:
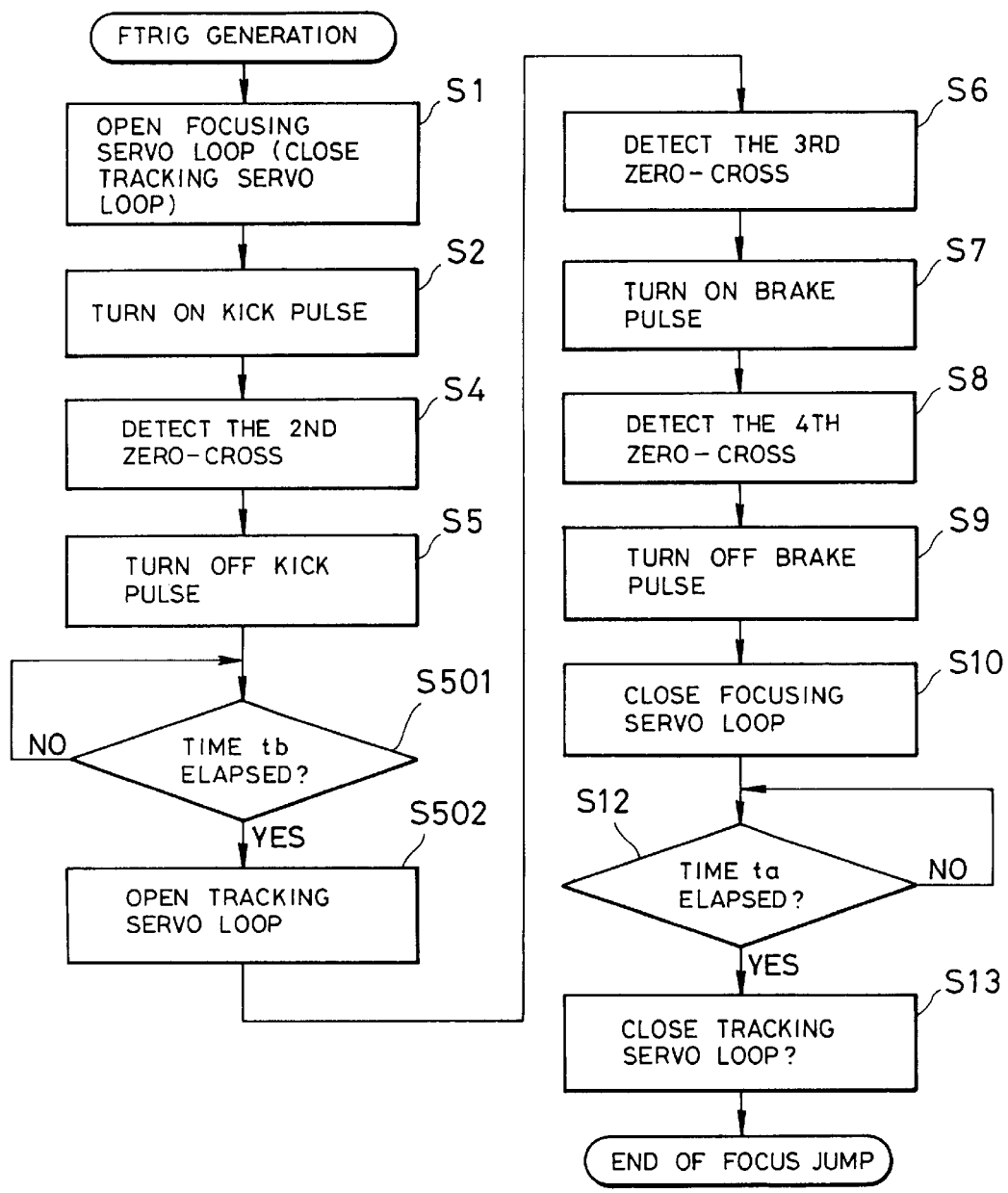
FIG. 10 is a flowchart showing a procedure of the focus jump operating process which is executed in a focus jump control apparatus in the third embodiment according to the invention.

FIG. 10 shows a procedure for the focus jumping process which is executed by the microcomputer 9 in a focus jump control apparatus according to the third embodiment. FIGS. 11A to 11I show modes of the operations in the respective sections corresponding to the procedure. The focus jump control apparatus also has a fundamental construction similar to that in FIG. 2, namely, the hardware is similarly constructed.

The processes shown in FIG. 10 differ from the processes shown in FIG. 3 with respect to a point that subsequent to step S5 to trail the kick pulse, the apparatus waits for the elapse of a predetermined time tb from the generation of the second zero-cross point ZC2 (step S501), the tracking servo loop is opened after the elapse of the predetermined time (step S502), and after that, a third zero-cross point detecting process in step S6 is executed. The processes in FIG. 10 also differ from those in FIG. 3 with respect to a point that subsequent to step S10 to turn on the focusing servo, the focus jump is finished through a procedure such that the apparatus waits for the elapse of the predetermined time ta after the generation of the fourth zero-cross point ZC4 (step S12) and the tracking servo loop is closed after the elapse of the predetermined time (step S13). The opening and closing operations of the tracking servo loop here are also similar to those mentioned above with respect to a point that the switching circuit 16 is controlled by each corresponding control signal TS. Each of the predetermined times is also measured by a timer built in the microcomputer 9.

FIGS. 11A to 11I show a state where the control signal TS is set to the high level and the tracking servo is turned off for a period of time from an elapsed time point Tb of the predetermined time tb after the generation of the second zero-cross point ZC2 to an elapsed time point Ta of the predetermined time ta after the generation of the fourth zero-cross point ZC4 as mentioned above. The time point Tb substantially corresponds to the time point when the focal point of the read light is moved to the center position between the original recording surface and the recording surface on the jump destination side. That is, in the embodiment, the tracking servo is turned off after it was decided that the focal point of the read light was sufficiently away from the original recording source. Actually, the tracking servo is turned off after detecting that the focal point of the read light was perfectly out of the focus control range (refer to FIG. 1) for the original recording surface and was certainly escaped from the S-shaped curve. While the focal point of the read light is moving on the original recording surface, therefore, the zero-cross point detection can be performed on the basis of the focusing error signal in which the waveform having the crosstalk due to the tracking error signal was fairly reduced. Since the unstable period of time is shorter than that in FIGS. 9A to 9I, a probability that the tracking servo becomes impossible is small.

As will be understood from the above description, the first and second embodiments are effective for the pickup in which a fluctuation of the focusing error signal by the crosstalk is large. Particularly, when there is no track deviation, the tracking error signal is converged most quickly in the first embodiment. The third embodiment is effective for the pickup in which the fluctuation of the focusing error signal by the crosstalk is relatively small or the pickup in which a possibility that the unstable state of the tracking error signal TE causes the impossibility of the tracking servo is high.

As mentioned above, since the crosstalk which is considered to be a problem by the invention is caused by a reason such that the apparatus has a construction in which the focusing system and the tracking system are optically, electrically, and mechanically close in the pickup, even in the pickups of the same type, the influences by the crosstalk individually differ depending on the making of the lens or the like. An embodiment which can properly selectively use those embodiments is the fourth embodiment.

FIG. 12 shows a procedure for the processes which are executed by the microcomputer 9 in the set-up operation in case of reading the disc again at a timing just after the power source of the player was turned on, just after a new disc was loaded into the player, or the like.

In the set-up mode, the microcomputer 9 first activates the timer (step S21) and executes the focus jump of the tracking servo continuation type, namely, a series of processes shown in FIG. 3 described in the first embodiment (step S22). Before shifting to first step S21, the apparatus has been preset to a state where the processes in the first embodiment can be properly executed after completion of the rotation of the loaded disc 1, the activation of the read light source, the resetting of various memories, and the like.

In step S22, as obviously understood by the foregoing description, the operating mode shown in FIG. 4A to 4I or the operating mode shown in FIGS. 7A to 7I is set. When there is no track slide for the disc 1 as a read target, the operating mode shown in FIGS. 4A to 4I is set. When there is a track slide, the operating mode shown in FIGS. 7A to 7I is set. In any of the above modes, when the focus jumping operation is finished, the microcomputer 9 discriminates whether the address data AD (refer to FIG. 1) could be obtained or not (step S23). A standby mode is performed until the address data AD can be obtained. When it is determined that the address data AD could be obtained, the counting operation of the timer is stopped (step S24). The count value of the stopped timer is compared with a reference value Ts (step S25).

The process in step S23 is a executed by discriminating whether the microcomputer 9 has just received the address data AD from the decoder 52 or not. If an amount of noises in the read signal is small and a quality is high, the decoder 52 can decode the address data AD. In this case, however, it largely depends on whether the focusing servo and the tracking servo stably operate on the target recording surface or not.

When the apparatus enters the mode shown in FIGS. 4A to 4I, therefore, since the focusing servo and the tracking servo are stabilized in a little while after the restart of the focusing servo, the address data AD is soon obtained after the restart of the focusing servo. In step S25, therefore, a fact that the count value of the timer is smaller than the reference value Ts is discriminated. The focus jump of the tracking servo continuation type is set in the focus jumping mode, namely, it is set so as to execute the processes shown in FIG. 3 described as the first embodiment (step S26).

When the apparatus enters the mode shown in FIGS. 7A to 7I, since the converging time of the tracking error signal TE becomes long due to the track slide as mentioned above, the focusing servo and the tracking servo are stabilized after the elapse of a long time from the restart of the focusing servo, so that the address data AD is obtained after the elapse of a long time from the restart of the focusing servo. In step S25, accordingly, a fact that the count value of the timer exceeds the reference value Ts is determined. The focusing jump of the tracking servo temporary intermittent type is set in the focus jumping mode, namely, it is set so as to execute the processes shown in FIGS. 8 or 10 described as the second or third embodiment (step S27).

Steps S26 and S27 are set in the memory 9m.

In the flowchart shown in FIG. 12, although the focus jumping mode is set on the basis of the one discrimination result by step S25, it is also possible to perform the processes and operations in steps S21 to S24 a plurality of times and to set the focus jumping mode on the basis of a plurality of discrimination results obtained. In case of constructing as mentioned above, it is preferable because the focus jumping mode can be more properly set for the disc 1.

When the focus jumping mode is set as mentioned above, the microcomputer 9 executes the focus jumping operation according to the set contents until the set-up is newly performed after that.

Figure 13:
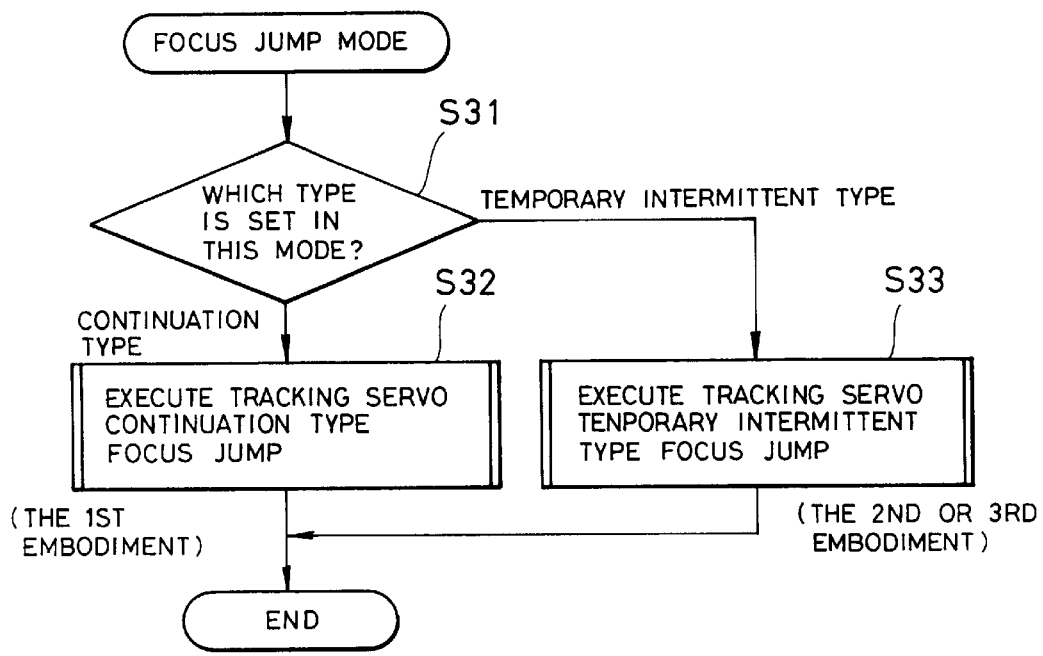
FIG. 13 is a flowchart showing a schematic processing procedure in a focus jumping mode which is executed in the focus jump control apparatus in the fourth embodiment according to the invention.

FIG. 13 shows a processing procedure. When an instruction to shift the operating mode to the focus jumping mode is issued to the microcomputer 9 by generating the jump instruction signal FTRIG or the like, the microcomputer 9 discriminates what has been set in the relevant mode on the basis of the set contents in the memory 9*m* (step S31). In accordance with the discrimination result, the focus jumping process of the corresponding type is executed (steps S32, S33).

According to the embodiments, whether the track slide occurs on the disc as a reading target or not is previously discriminated. When there is no track slide, the focusing operation described in the first embodiment that is effective to this case is executed. When there is the track slide, the second or third embodiment which is effective to this case is selected. The jumping operation suitable for the disc as a reading target can be consequently executed, thereby making it possible to prevent that a desired time for the jumping operation becomes remarkably long.

As a detecting method of the track slide, other various methods are considered. In place of the detection of the track slide based on the execution in step S22, therefore, it is sufficient to provide another track slide detecting means and to select and execute either one of the tracking servo continuation type focus jump and the tracking servo temporary intermittent type focus jump in the jumping mode in accordance with the detection result.

In the description so far, the focus jumping operation in one direction has been described. In case of the focus jumping operation in the opposite direction, however, the polarity of the S-shaped curve of the focusing error signal FE is reversed and the driving direction of the focusing actuator is also reversed. It is, accordingly, sufficient to generate the kick pulse, brake pulse, and jump status signal corresponding to them.

Although the double-layer recording type DVD has been mentioned in the above embodiments, the invention is not limited to this type of DVD but can be also applied to any disc in which information recording surfaces are formed in at least two layers.

Although the limitative description has been made in the above embodiments, many variations and modifications are also possible within the scope which can be designed by those with ordinary skill in the art.

According to the invention as described above, the focus jumping operation can surely be achieved without causing an erroneous operation of the focusing actuator.

What is claimed is:

1. A focus jump control apparatus comprising:

reading means for irradiating read light to a disc having information recording surfaces formed on at least two layers, respectively;

a focusing servo loop for allowing an optimum light converging position of said read light to trace said recording surface in response to a focusing error signal generated based on return light from said disc by using a focusing actuator for displacing the optimum light converging position of said read light in the optical axial direction; and a tracking servo loop for allowing the optimum light converging position of said read light to trace tracks formed on said disc; and loop opening/closing control means for opening said focusing servo loop in response to a n instruction and for closing said focusing servo loop when a movement of the optimum light converging position of said read light from one of said recording surfaces to the other is finished, wherein a closed state of said tracking servo loop is maintained during the movement of the optimum light converging position of said read light.

2. An apparatus according to claim 1, further comprising:

jump driving means for generating a drive signal of said focusing actuator for moving the optimum light converging position of said read light from one of said recording surfaces to the other based on said focusing error signal under the control in which said focusing servo loop is opened and said tracking servo loop is closed.

3. An apparatus according to claim 2, wherein said drive signal includes an acceleration signal for accelerating and displacing said focusing actuator in the moving direction of the optimum light converging position of said read light.

4. An apparatus according to claim 2, wherein said drive signal includes a deceleration signal for decelerating said focusing actuator so as to stop the movement of the optimum light converging position of said read light.

5. An apparatus according to claim 3, wherein said drive signal includes a deceleration signal for decelerating said focusing actuator so as to stop the movement of the optimum light converging position of said read light.

6. A focus jump control apparatus comprising:

reading means for irradiating read light to a disc having information recording surfaces formed on at least two layers, respectively;

a focusing servo loop for allowing an optimum light converging position of said read light to trace said recording surface in accordance with a focusing error signal generated based on return light from said disc by using a focusing actuator for displacing the optimum light converging position of said read light in the optical axial direction;

a tracking servo loop for allowing the optimum light converging position of said read light to trace tracks formed on said disc; and loop opening/closing control means for opening said focusing servo loop in response to an instruction and for closing said focusing servo loop when a movement of the optimum light converging position of said read light from one of said recording surfaces to the other is finished, wherein a closed state of said tracking servo loop is maintained for a predetermined period of time until a first timing during the movement of the optimum light converging position of said read light, and said tracking servo loop is opened subsequently.

7. An apparatus according to claim 6, further comprising jump driving means for generating an acceleration signal which accelerates and displaces said focusing actuator in the moving direction of the optimum light converging position of said read light from one of said recording surfaces to the other based on said focusing error signal under the control in which said focusing servo loop is opened and said tracking servo loop is closed.

8. An apparatus according to claim 6, wherein said first timing is a timing where the optimum light converging position of said read light is away from a control range of said focusing actuator for one of said recording surfaces.

9. An apparatus according to claim 6, further comprising detecting means for detecting a point where said focusing error signal has passed a predetermined level as a specific level cross point, and wherein said first timing is a timing after the elapse of a predetermined time from the detection timing of said specific level cross point after the optimum light converging position of said read light was away from a control range of said focusing actuator for one of said recording surfaces.

10. An apparatus according to claim 6, wherein said tracking servo loop is closed at a second timing and said second timing is a timing after a closing timing of said focusing servo loop.

11. An apparatus according to claim 8, wherein said tracking servo loop is closed at a second timing and said second timing is a timing after a closing timing of said focusing servo loop.

12. An apparatus according to claim 9, wherein said tracking servo loop is closed at a second timing and said second timing is a timing after a closing timing of said focusing servo loop.

13. An apparatus according to claim 7, wherein said jump driving means generates a deceleration signal for decelerating said focusing actuator so as to stop the movement of the optimum light converging position of said read light subsequent to said acceleration signal.

14. A focus jump control apparatus comprising:

reading means for irradiating read light to a disc having information recording surfaces formed on at least two layers, respectively;

a focusing servo loop for allowing an optimum light converging position of said read light to trace said recording surface in accordance with a focusing error signal generated based on return light from said disc by using a focusing actuator for displacing the optimum light converging position of said read light in the optical axial direction;

a tracking servo loop for allowing the optimum light converging position of said read light to trace tracks formed on said disc; and selecting means for selecting either one of a tracking servo continuation type focus jumping operation and a tracking servo temporary intermittent type focus jumping operation as an operation to be executed in a jumping mode, wherein said tracking servo continuation type focus jumping operation is the operation for opening said focusing servo loop in response to an instruction, for closing said focusing servo loop when a movement of the optimum light converging position of said read light from one of said recording surfaces to the other is finished, and for maintaining the closing state of said tracking servo loop during the movement of the optimum light converging position of said read light, and said tracking servo temporary intermittent type focus jumping operation is the operation for opening said focusing servo loop in response to an instruction, for closing said focusing servo loop when the movement of the optimum light converging position of said read light from one of said recording surfaces to the other is finished, for maintaining the closing state of said tracking servo loop for a predetermined period of time until a first timing during the movement of the optimum light converging position of said read light, and for subsequently opening said tracking servo loop.

15. An apparatus according to claim 14, further comprising detecting means for detecting a deviation between the track formed on one of said recording surfaces and the track formed on the other recording surface, and wherein said selecting means selects either one of said tracking servo continuation type focus jumping operation and said tracking servo temporary intermittent type focus jumping operation in accordance with a detection result of said detecting means.

16. An apparatus according to claim 15, wherein said detecting means executes said tracking servo continuation type jumping operation at the time of set-up, detects that a predetermined signal is obtained from a read signal, counts a time from a predetermined time point until a time point when said predetermined signal is obtained, compares a count time with a reference value, allows said selecting means to select said tracking servo continuation type focus jumping operation when said count time is smaller than said reference value, and allows said selecting means to select said tracking servo temporary intermittent type focus jumping operation when said count time is equal to or larger than said reference value.

* * * * *